United States Patent [19]
Omote

[11] Patent Number: 5,648,002
[45] Date of Patent: Jul. 15, 1997

[54] WORK TRANSFERRING APPARATUS FOR THERMAL CUTTING MACHINE

[75] Inventor: Kenji Omote, Ishikawa, Japan

[73] Assignee: Kabushiki Kaisha Komatsu Seisakusho, Tokyo, Japan

[21] Appl. No.: 424,331

[22] PCT Filed: Nov. 12, 1993

[86] PCT No.: PCT/JP93/01663

§ 371 Date: Apr. 25, 1995

§ 102(e) Date: Apr. 25, 1995

[87] PCT Pub. No.: WO94/11145

PCT Pub. Date: May 26, 1994

[30] Foreign Application Priority Data

Nov. 13, 1992 [JP] Japan ..................... 4-303503

[51] Int. Cl.$^6$ ............. B23K 26/10; B21D 43/00; B23Q 1/03; B23Q 1/72
[52] U.S. Cl. ............. 219/121.82; 83/155; 219/121.58
[58] Field of Search ............. 219/121.82, 121.67, 219/121.39, 121.58; 83/155, 155.1

[56] References Cited

U.S. PATENT DOCUMENTS 5,128,512  7/1992  Seki ..................... 219/121.82
5,185,510  2/1993  Zumstein ............. 219/121.82
5,585,015  12/1996  Hayashi et al. ...... 219/121.67

FOREIGN PATENT DOCUMENTS

| 56-131 | 1/1981 | Japan . | |
| 62-94237 | 4/1987 | Japan | 219/121.67 |
| 62-202991 | 12/1987 | Japan . | |
| 3-19651 | 2/1991 | Japan . | |
| 3-60891 | 3/1991 | Japan . | |
| 3-51927 | 5/1991 | Japan . | |
| 4-22593 | 1/1992 | Japan | 219/121.82 |

*Primary Examiner*—Geoffrey S. Evans
*Attorney, Agent, or Firm*—Wenderoth, Lind & Ponack

[57] ABSTRACT

A work transferring apparatus for a thermal cutting machine is used for processing a workpiece placed on a worktable moving freely along an X axis direction by means of a work head moving freely along a Y axis direction crossing the X axis direction. The apparatus includes a chain conveyor mounted at an upper portion of the worktable for transferring the workpiece in and out, a body having a plurality of roller conveyors for transferring the workpiece to the chain conveyor, and a separating mechanism mounted between the chain conveyor of the worktable and the roller conveyor of the body for separating the workpiece after it is processed into a product and scrap. The body is arranged in a vicinity of the worktable, and the workpiece is set freely on the roller conveyor of the body.

3 Claims, 11 Drawing Sheets

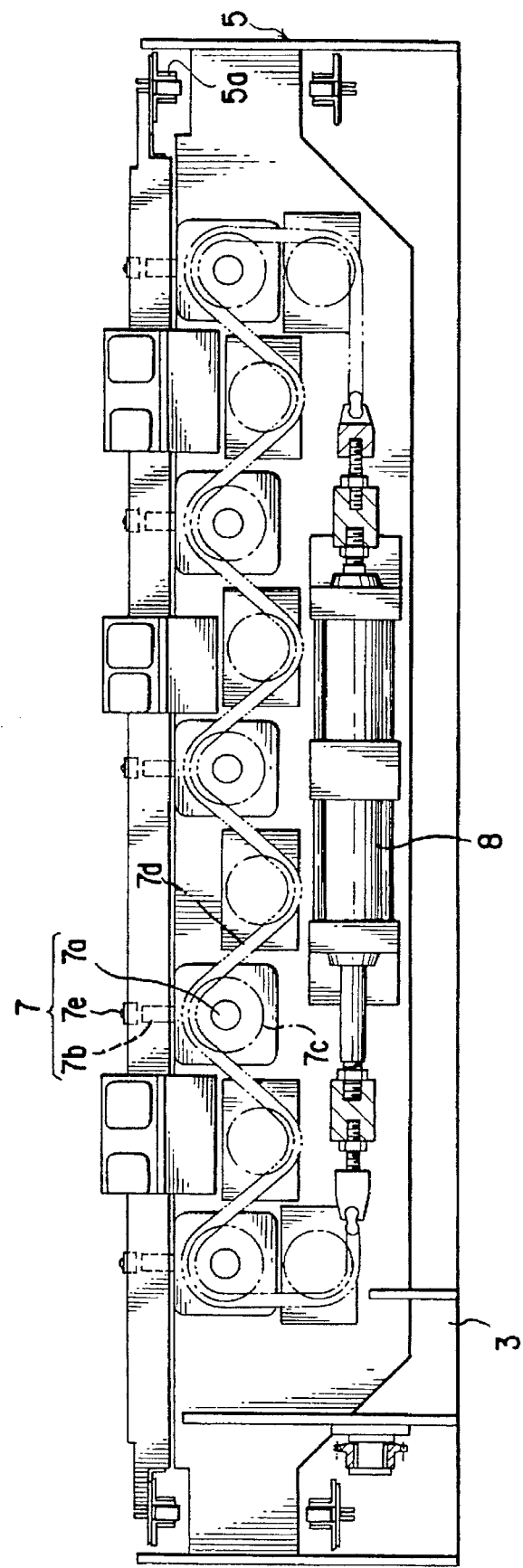

WORK TRANSFERRING APPARATUS FOR THERMAL CUTTING MACHINE

TECHNICAL FIELD

The present invention relates to a work transferring apparatus for a thermal cutting machine for transferring a workpiece in and out automatically.

BACKGROUND ART

As a conventional work transferring apparatus which transfers a workpiece in and out of a thermal cutting machine such as laser work machine or plasma work machine, there are publicly known such devices as disclosed in the Japanese Utility Model Laid-open Publications No. HEI 3-51927 and No. HEI 3-19651 and the Japanese Patent Laid-open Publication No. HEI 3-60891.

The work transferring apparatus disclosed in these publications transfers the workpiece from an auto-stoker into a cutting machine by means of a vacuum type loader of. After the workpiece is processed by of the thermal cutting machine, the work transferring apparatus transfers the processed workpiece out of the machine by means of a magent type un-loader with a product and a scrap being microjointed. That is, a series of work transferring processes is performed automatically.

However, in the work transferring apparatus, there are some problems because the separation of the product and the scrap, which are carried out in the microjointed state, is done through manual work, thus providing adverse productivity. In addition, since the size of the scrap which is separated from the product is large, it is troublesome to recover the scrap.

Furthermore, since the vacuum type loader and the magnet type un-loader are both of vacuum hanging type, if a workpiece, for example, a thick plate, has a heavy weight, there is a fear that the loader and the un-loader will fall down. Further, because the top one of the workpieces which are stacked is lifted by suction, if the workpieces are thin plates, it is likely plural workpieces will be stuck together and conveyed out together with the in a so-called double-blank state. When such double-blank state is caused, the thermal cutting machine stops page automatically, resulting in the stop of the workpiece cutting machine, lowering of the operational efficiency of the thermal cutting machine, and inconveniently.

Still further, in the conventional apparatus, since the vacuum type loader and the magnet tape un-loader are used, the structure of the work transferring apparatus is complicated and the manufacturing cost is high.

The present invention is directed to overcoming the foregoing problems, and accordingly, it is an object of the present invention to provide a work transferring device of a thermal cutting machine, which need not convey workpieces microjointed to another working place to separate the product and the scrap from each other, with the result that the productivity and the operational efficiency of the machine can be improved, and that the work transferring apparatus has a simple structure and can be manufactured at a reduced cost.

DISCLOSURE OF THE INVENTION

In order to achieve the above and other objects, according to one aspect of the present invention, there is provided a work transferring apparatus for a thermal cutting machine for processing a workpiece placed on a worktable moving freely along an X axis direction by means of a work head moving freely along a Y axis direction crossing the X axis direction, the apparatus being characterized in that:

a chain conveyor is mounted at an upper portion of the worktable for transferring the workpiece in and out, a body of the work transferring apparatus, having a plurality of roller conveyors for transferring the workpiece to the chain conveyor, is arranged in a vicinity of the worktable, the workpiece being set freely on the roller conveyor of the body, and a separating mechanism is mounted between the chain conveyor of the worktable and the roller conveyor of the body for separating the workpiece after being processed into a product and scrap.

According to this structure, since the processed workpiece can be separated into the product and the scrap and then carried out, it is not necessary to separate, in a different station, the product and the scrap of the workpiece microjointed, thus improving the productivity thereof. Furthermore, since the roller conveyor is utilized for transferring the workpiece, the workpiece never falls down during the conveyance, thus improving the safety. Still further, since the roller conveyor is employed, the structure of the apparatus can be made simple in comparison with a vacuum type loader or magnet type unloader, and moreover, the manufacturing cost is lowered.

Preferably, in addition to the above structure, the roller conveyors are in a multi-stage arrangement to be movable vertically, and a plurality of workpieces are set freely an each of the roller conveyors, respectively.

According to this structure, since the workpieces are placed one by one on the respective stages of the roller conveyors, a double-blank state is not caused, such that operational efficiency of the machine is improved.

Furthermore, a chain of the roller conveyor lifted up to a position of the same height as that of the chain conveyor of the worktable and a conveyor motor of the chain conveyor are connected automatically through a connection mechanism so that only the roller of the roller conveyor of the stage connected to the chain conveyor is rotated in synchronism with the rotation of the chain conveyor.

According to this structure, periodic operation of the work transferring apparatus is enabled.

BRIEF DESCRIPTION OF THE DRAWINGS

The invention will be readily understood by referring to the following description and accompanying drawings illustrating a preferred embodiment of the present invention. The disclosure of this preferred embodiment does not limit the present invention and is only used to enable a ready understanding of the invention. In the drawing:

FIG. 6 is a detailed view of a work lifter provided for the worktable;

DETAILED DESCRIPTION OF THE INVENTION

Figure 1:
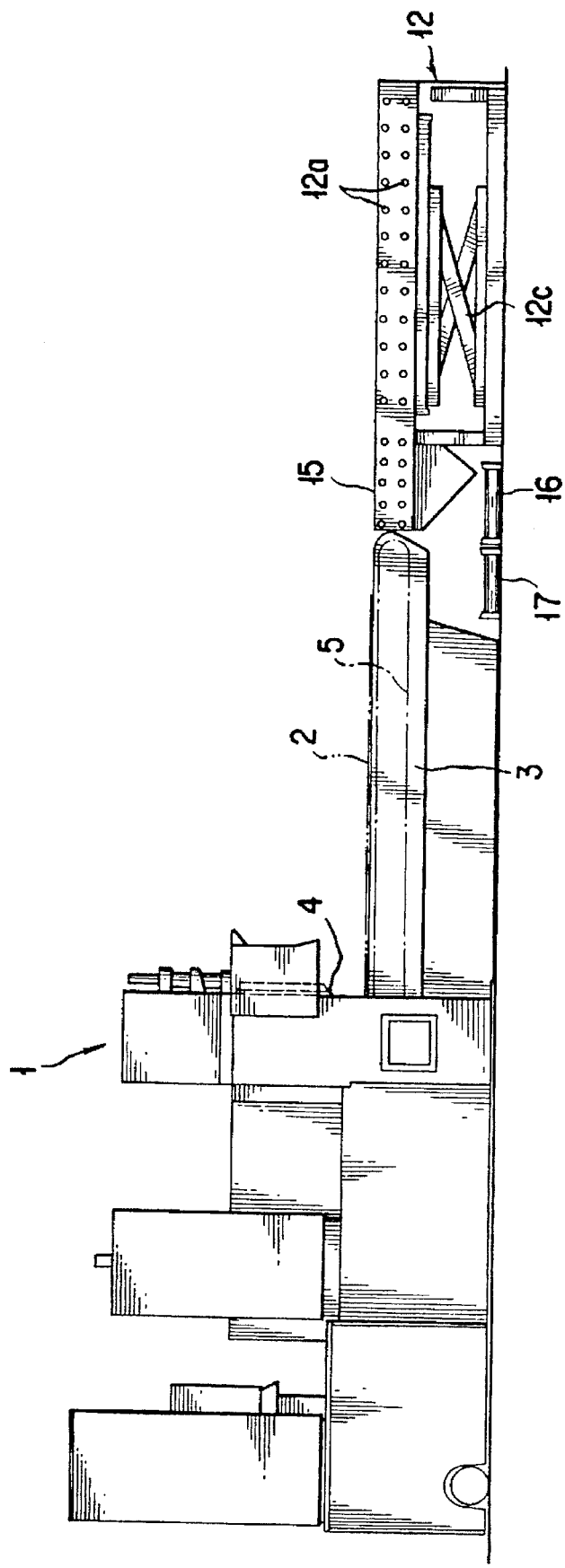
FIG. 1 is a front view entirely showing a work transferring device of a thermal cutting machine according to one embodiment of the present invention.

A workpiece transferring apparatus for a thermal cutting machine will be described hereunder in detail by reference to one embodiment illustrated in the drawings.

Figure 2:
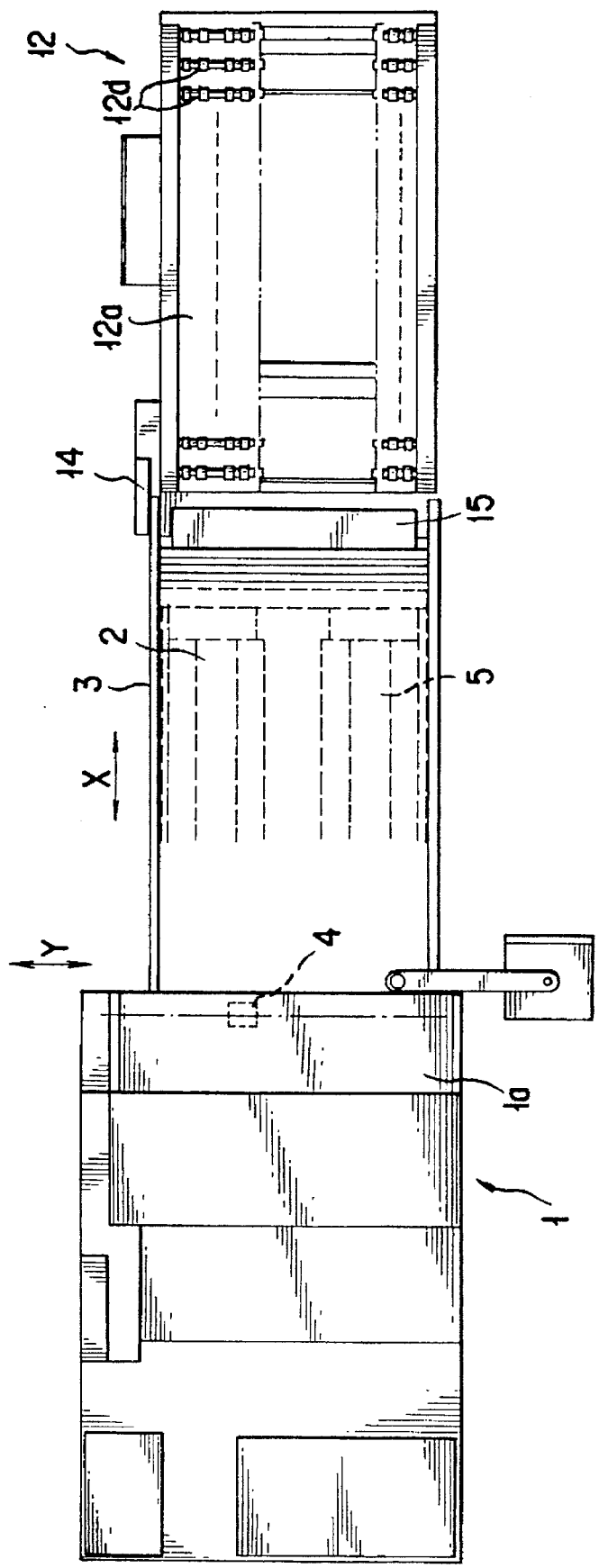
FIG. 2 is a plan view of the embodiment of FIG. 1.

In FIGS. 1 and 2, reference number 1 indicates a thermal cutting machine, the thermal cutting machine 1 having a worktable 3 on which a workpiece 2 to be processed is put. The worktable 3 is provided with a gate-type column 1a over itself, the gate-type column 1a being provided with a working head 4 in such a way that the working head 4 may move in the Y axis direction crossing the X axis direction which is a moving direction of the worktable 3. The working head 4 is adapted to process the workpiece 2 on the worktable 3.

Figure 3:
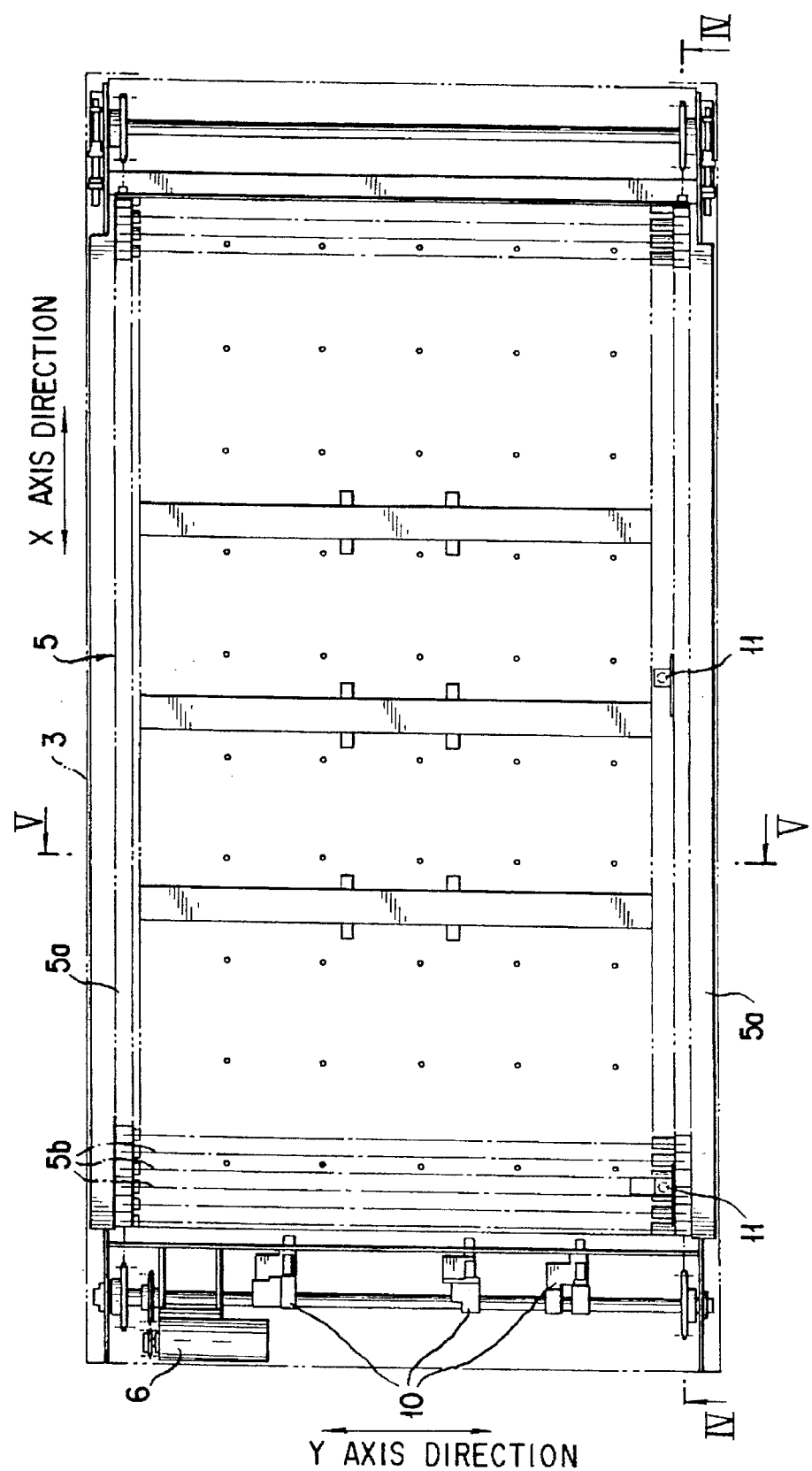
FIG. 3 is a plan view of a worktable of the thermal cutting machine.
Figure 4:
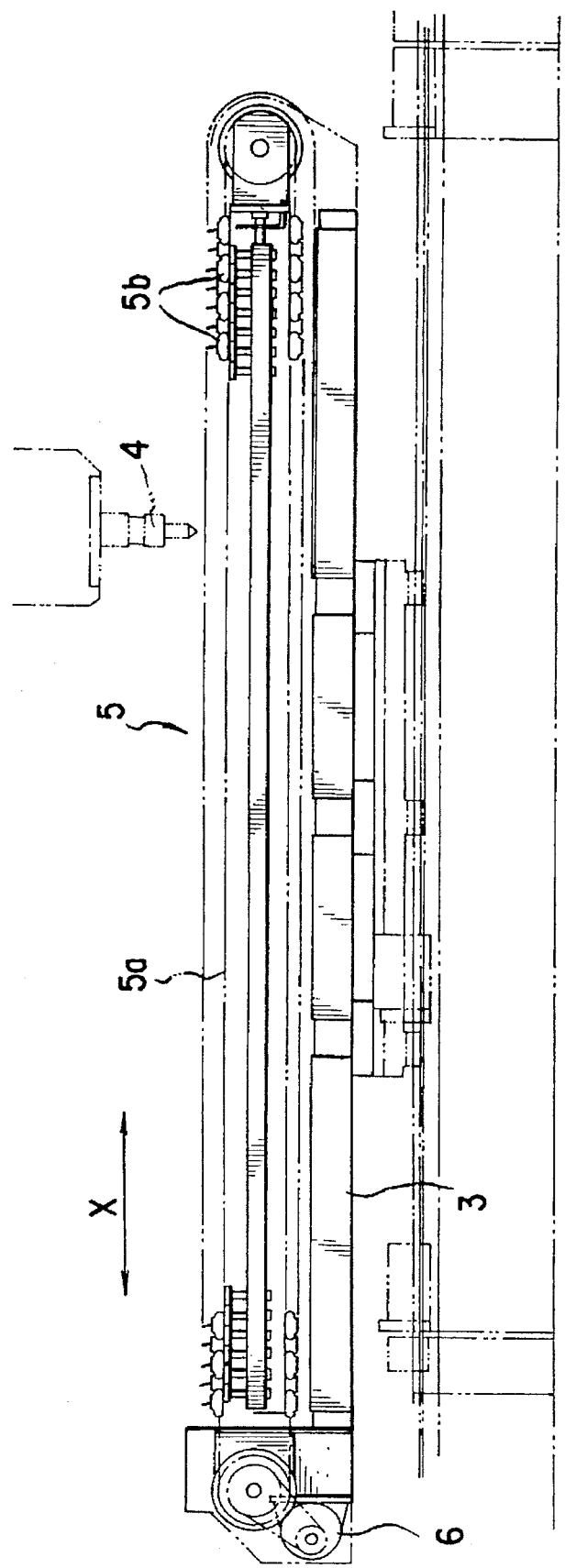
FIG. 4 is a cross-sectional view taken on line IV—IV of FIG. 3.
Figure 5:
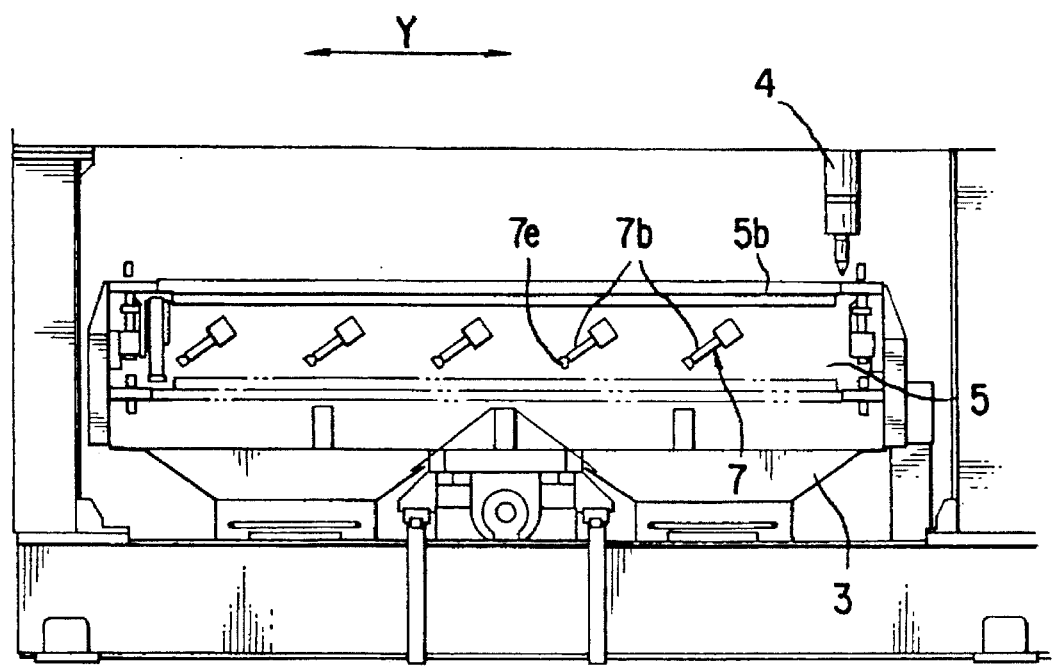
FIG. 5 is a cross-sectional view taken on line V—V of FIG. 3.

A chain conveyor 5 is provided at the upper portion of the worktable 3 for transferring the workpiece 2 in and out of the machine. The chain conveyor 5 is provided with a pair of chains 5a and a lot of work supporting members 5b. The work supporting members 5b, each of which is constructed with a belt plate or the like, are mounted between the pair of chains 5a, each of which is stretched at one of the inner sides of a frame 3a of the worktable 3. The work supporting members 5b are adapted to support the workpieces 2 from the back sides thereof. Furthermore, as shown in FIGS. 3 and 4, the chain conveyor 5 is adapted to be able to convey the workpiece 2 on the work supporting members 5b is the X axis direction by rotating the chains 5a with a conveyor motor 6.

In the chain conveyor 5, a work lifter 7 is provided. The work lifter 7 comprises a plurality of rotational shafts 7a and a plurality of supporting rods 7b fixed to the rotational shafts 7a, respectively. A plurality of sprockets 7c are respectively mounted at first ends of the rotational shafts, which are simultaneously rotated by rotating chains 7d wound up around these sprockets 7c by a lifter cylinder 8 mounted to a lower portion of the worktable 3.

The top end of each of the supporting rods 7b projects upwards from a gap between the work supporting members 5b of the chain conveyor 5 which has now stopped, and a plurality of free bearings 7e mounted to the upper ends of the supporting rods 7b respectively abut against the bottom surface of the workpiece 2 which lies on the work supporting members 5b, thereby lifting up the workpiece 2 upwardly through the upward movement of the work supporting rods 7b.

Figure 7A:
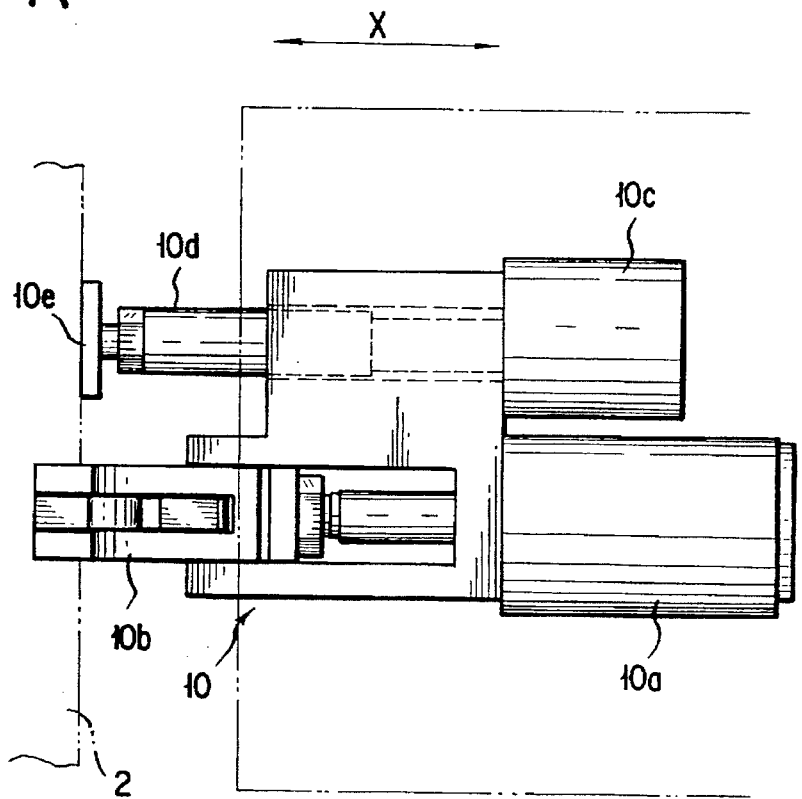
FIGS. 7A and 7B are plan and cross-sectional views, respectively, of a clamp provided with the worktable.
Figure 7B:
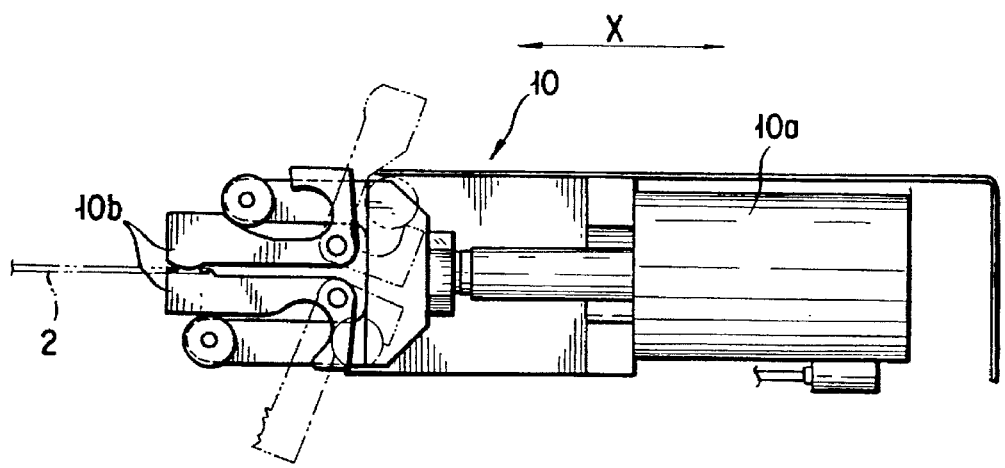

A plurality of clamps 10 are provided at one end of the worktable 3 for holding the workpiece 2 transferred in by the chain conveyor 5. Each of the clamps 10 has a pair of nail members 10b as shown in FIGS. 7A and 7B which is opened and closed by a clamp cylinder 10a. The pair of nail members 10b are adapted to hold one end of the workpiece 2. A stopper cylinder 10c is provided on the side of the clamp cylinder 10a, and an X axis directional stopper 10e for stopping the workpiece 2 in a fixed position in the X-axis direction is provided at the front end of a piston rod 10d of the stopper cylinder 10c.

Figure 8A:
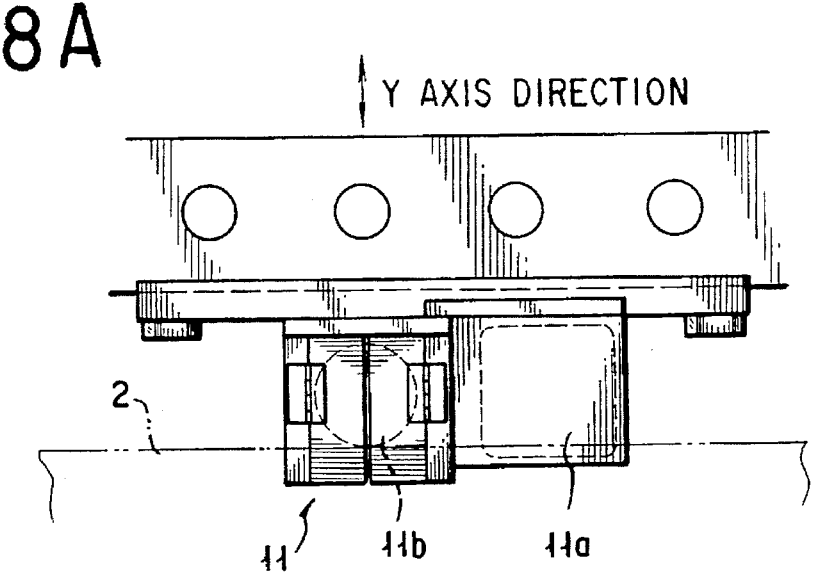
FIGS. 8A and 8B are plan and cross-sectional views, respectively, of a Y axis directional stopper provided for the worktable.
Figure 8B:
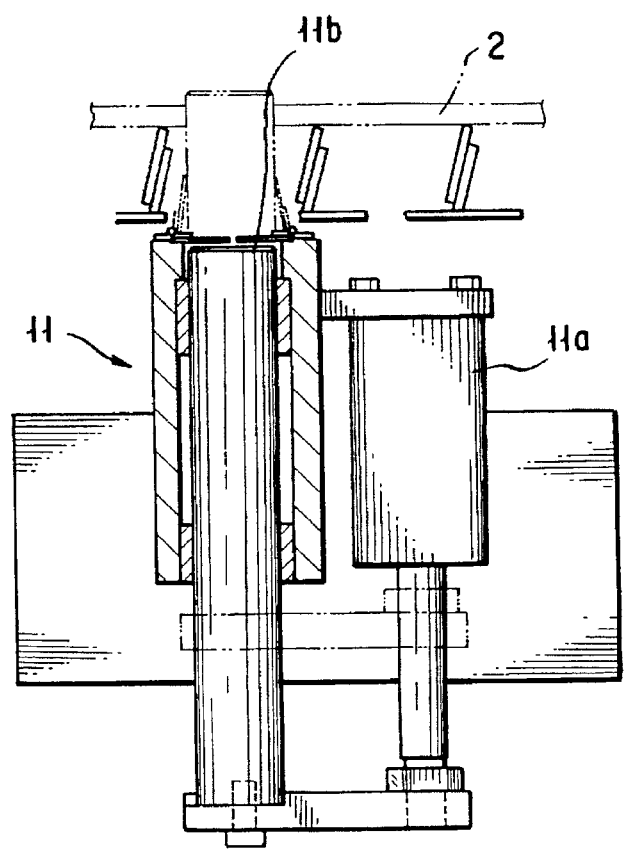

Further, a plurality of Y axis directional stoppers 11 are provided at the side portion of the work table 3 for positioning the workpiece 2 in the Y axis direction. Each of the Y axis directional stoppers 11 has, as shown in FIGS. 8A and 8B, a stopper pin 11b which is moved vertically by a stopper cylinder 11a, which projects upward from the upper plane of work supporting members 5b only when the workpiece 2 is positioned in the Y axis direction.

Moreover, in FIGS. 1 and 2, a reference numeral 12 denotes a body of the work transferring device.

Figure 9:
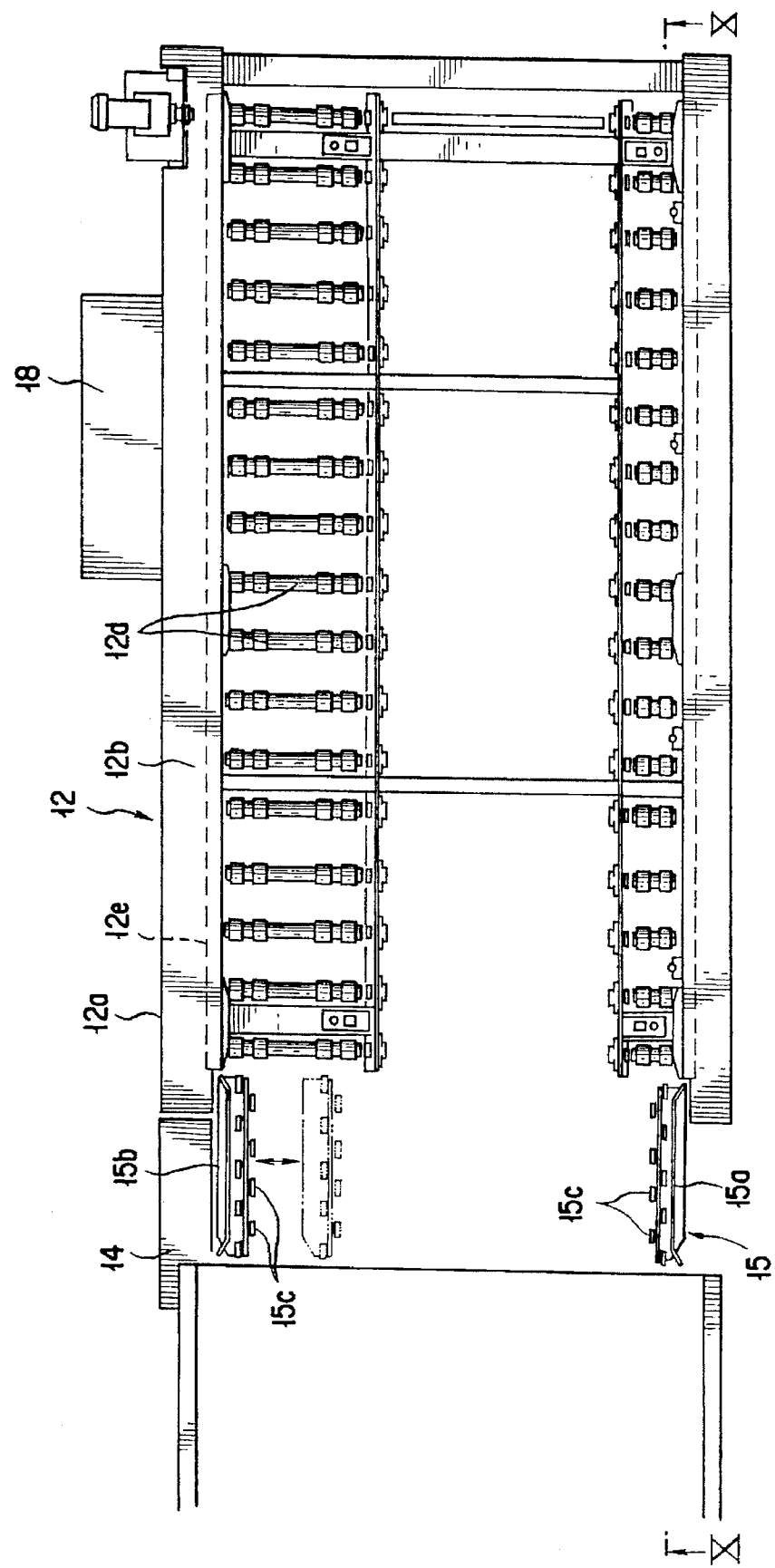
FIG. 9 is a plan view which illustrates the body of the work transferring device of the above embodiment.
Figure 10:
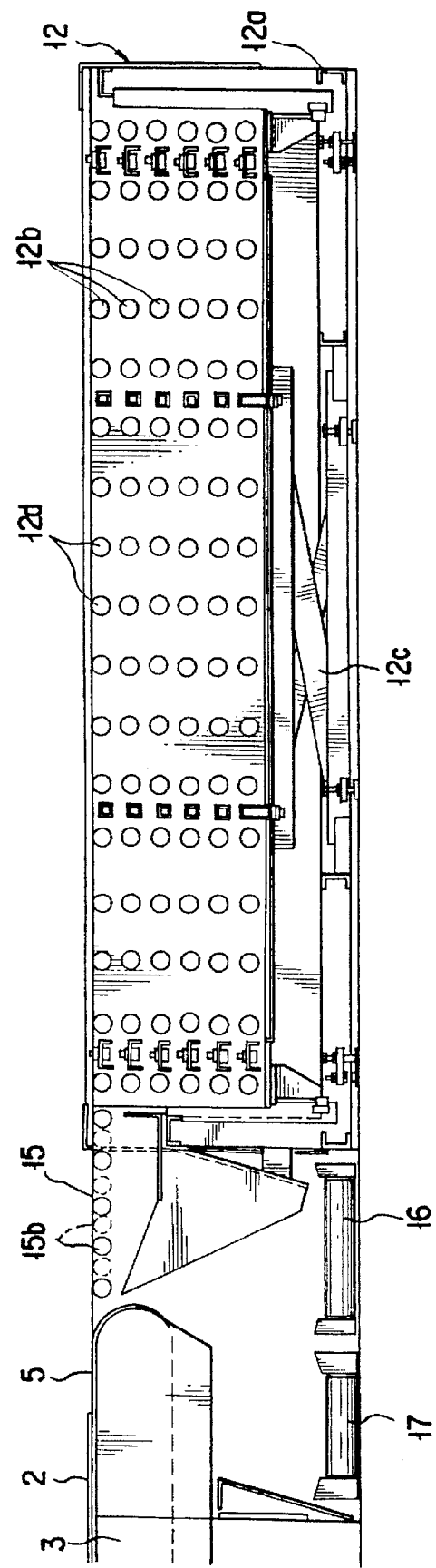
FIG. 10 is a cross-sectional view taken on line X—X of FIG. 9.
Figure 11:
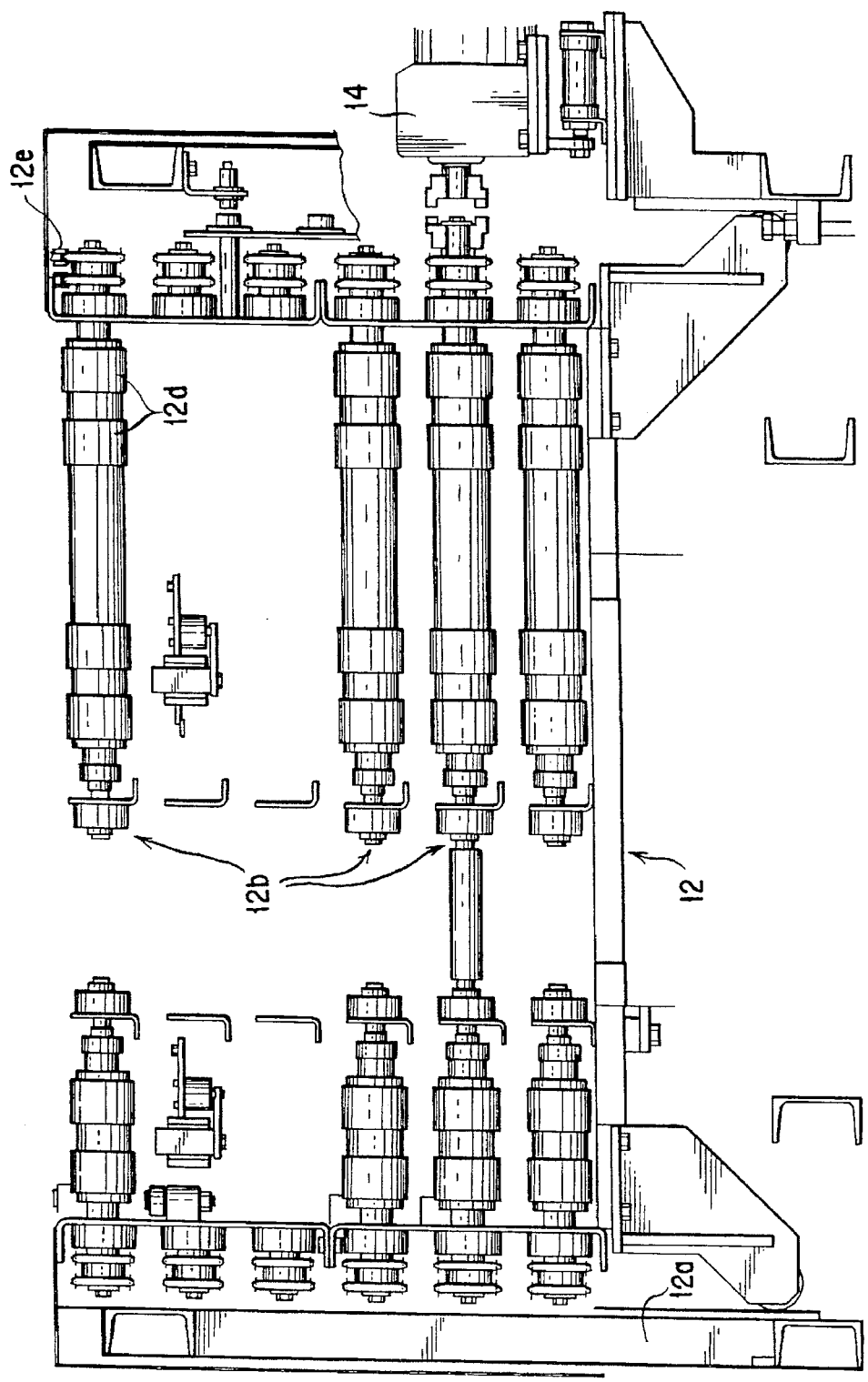
FIG. 11 is a detailed view of a roller conveyor of the embodiment.

The body 12 is constructed with multi-stage roller conveyors as shown in FIGS. 9 to 11.

In a frame 12a forming the body 12, a plurality of roller conveyors 12b are provided, which are arranged in a plurality of stages. Each of the roller conveyors 12b is constructed so as to be moved up and down freely by a lifter 12c, each of rollers 12d provided at the each stage of the roller conveyors 12b being operated in each stage by means of a chain 12e.

The chain 12e of the roller conveyor 12b, which is lifted to the same height as that of the chain conveyor 5 of the worktable 3 by the lifter 12c, and the conveyer motor 6 of the chain conveyor 5 are connected automatically through a connection mechanism 14, so that only the roller 12d of the roller conveyor 12b of the stage connected to the chain conveyor 5 is rotated in synchronism with the rotation of the chain conveyor 5.

A separating mechanism 15 is provided between the body 12 and worktable 3 for separating the workpiece 2 into the product and the scrap. This separating mechanism 15 has, as shown in FIG. 9, a pair of side girders 15a and 15b. One 15a of the side girders is fixed and the other one 15b thereof is constructed to be movably adjustable in accordance with a width of the workpiece 2. A plurality of rollers 15c are provided at each of the side girders 15a and 15b respectively, and as shown in FIG. 10, a product transfer-out conveyor 16 and scrap transfer-in conveyor 17 are provided below the separating mechanism 15.

Next, the operation of this embodiment will now be described.

One workpiece 2 to be processed is placed on each of the roller conveyors 12b provided for the work transferring apparatus 12. In response to a command from a control board 18, the lifter 12c is operated so as to lift up all the roller conveyors 12b so that the roller conveyor 12b of a commanded stage is lifted up to a position of the same height as that of the chain conveyor 5 of the worktable 3.

Then, the workpiece 2 on each of the roller conveyors 12b is transferred by way of the separating mechanism 15 onto the chain conveyor 5 of the worktable 3 because the roller conveyor 12b is rotated in synchronism with the rotation of the chain conveyor 5 by means of the conveyor motor 6, and the workpiece 2 is then conveyed until it abuts against the X axis directional stopper 10e by the chain conveyor 5.

Thereafter, the supporting rod 7b of the work lifter is rotated upward so that each of the free bearings 7e provided at the upper end of the supporting rod 7b pushes up the workpiece 2. Under this state, the workpiece 2 becomes movable in the horizontal direction. Therefore, the workpiece 2 is moved in the Y axis direction with a side push cylinder, not shown, and pressed against the Y axis directional stopper 11, thus performing the positioning of the workpiece 2 in the Y axis direction.

Upon completing the Y directional positioning of the workpiece 2, each of the supporting rods 7b is moved down to a waiting position and the workpiece 2 is placed on the work supporting member 5b of the chain conveyor 5, and at this position, one end of the workpiece 2 is held by the clamps 10.

Under this state, the workpiece 2 is moved in the X axis direction, and the workpiece 2 on the work table 3 is processed by the working head 4 moving in the Y axis direction.

After the processing of the workpiece 2 has been completed, the workpiece 2 is released from the clamps 10, and thereafter, the workpiece 2 is transferred out to the side at which the body 12 is placed. When the workpiece 2 passes through the separating mechanism 15, the product is separated from the scrap by the separating mechanism 15 and the separated product falls down onto the work conveyor 16. Then, the workpiece 2 is transferred out by the work conveyor 16. On the other hand, the scrap is once returned to the roller conveyor 12b in body 12 and, after that, transferred onto the worktable 3 by the chain conveyor 5, the scrap being shredded with the working head 4 to the side so that is can be conveyed out. Then, the shredded scrap is transferred out to the separating mechanism 15 by means of the chain conveyor 15 and then falls down, through the gap between the side girders 15a and 15b thereof, onto the scrap transfer-out conveyor 17 and the scrap is then transferred out so as to be separated from the product.

As described above, according to the embodiment of the present invention, the conveyance and processing of the workpiece 2 and the separation and the transfer-out of the product and the scrap can be all automatically performed by previously setting the workpieces 2 on the respective conveyors 12b of the body 12, thus enabling unmanned operation of the work cutting machine.

As described in detail hereinabove, according to the present invention, since the workpieces 2 can be separated into the product and the scrap after the processing thereof, it is not necessary to separate the processing workpiece 2 into the product and the scrap through an additional process, thus improving the productivity of the work transferring machine. Moreover, since the scrap is transferred out after the scrap has been shredded, it is easy to recover the scrap.

Furthermore, since the roller conveyor 12b is utilized for transferring the workpiece 2, the workpiece 2 which is being transferred never falls down, thus achieving an improved safety.

Still further, since only the mechanism composed of the roller conveyors 12b in the multi-stage arrangement is employed, the structure of the mechanism can be made simple in comparison with the structure utilizing a vacuum type loader or a magnet type unloader. The cost involved for the manufacturing is also reduced.

Since a plurality of roller conveyors 12b are in a multi-stage arrangement, stage, each of which is moved up and down freely by the lifter 12c, and the workpiece 2 is set freely an each of the roller conveyors 12b, the workpieces 2 can be placed one by one on each stage of the roller conveyors 12b. Thus, the double-blank state is not caused and the operational efficiency of the work cutting machine can be improved. Furthermore, since it is possible to set workpieces 2 having different, for example, sizes, widths, and so on, the production of many forms and small quantities of products can be effectively realized.

Furthermore, it is to be noted by those skilled in the art that the present invention is described above by reference to an exemplary embodiment, but many other changes, deletions and additions may be possible without departing from the subject matter and scope of the present invention with respect to the described embodiment. Accordingly, it is to be understood that the present invention is not limited to the described embodiment and involves a scope defined by the elements recited in the patent claims and scopes equivalent thereto.

POSSIBILITY OF INDUSTRIAL USAGE

As described hereinbefore, the work transferring apparatus for the thermal cutting machine according to the present invention is extremely useful as an apparatus for a laser processing machine or a plasma processing machine for effectively performing cutting.

I claim:

1. A work transferring apparatus for a thermal cutting machine for processing a workpiece placed on a worktable moving freely along an X axis direction by a work head moving freely along a Y axis direction crossing the X axis direction, wherein:

a chain conveyor is mounted at an upper portion of the worktable for transferring the workpiece in and out; a body of the work transferring apparatus, having a plurality of roller conveyors for transferring the workpiece to the chain conveyor, is arranged in a vicinity of the worktable such that the workpiece can be set freely on one of the roller conveyors; a separating mechanism is mounted between the chain conveyor and the roller conveyor for separating the workpiece, after it is processed, into a product and scrap; and said roller conveyors are disposed in a multi-stage arrangement so as to be movable vertically and so that a plurality of workpieces can be set freely on each of the roller conveyors, respectively.

2. A work transferring apparatus according to claim 1, wherein the chain conveyor includes a conveyor motor; each of the roller conveyors includes a chain and can be lifted up to a position of the same height as that of the chain conveyor; and a connection mechanism is provided for automatically connecting the conveyor motor of the chain conveyor to the roller conveyor which is lifted up to the same height as the chain conveyor, so that only the roller conveyor connected to the chain conveyor is rotated in synchronism with the rotation of the chain conveyor.

3. A work transferring apparatus for a thermal cutting machine for processing a workpiece placed on worktable moving freely along an X axis direction by a work head moving freely along a Y axis direction crossing the X axis direction, wherein:

a chain conveyor is mounted at an upper portion of the worktable for transferring the workpiece in and out; a body of the work transferring apparatus, having a plurality of roller conveyors for transferring the workpiece to the chain conveyor, is arranged in a vicinity of the worktable such that the workpiece can be set freely on one of the roller conveyors; a separating mechanism is mounted between the chain conveyor and the roller conveyor for separating the workpiece, after it is processed, into a product and scrap; and said separating mechanism has a pair of side girders, and a space between the pair of side girders is made adjustable to accommodate workpieces of different widths.

\* \* \* \* \*